INVENTORS: J. A. HACKETT
W. A. O'CONNELL
BY
Donald M Duft
ATTORNEY

3,351,713
MULTIPLE ACCESS COMMON CONTROL AND RINGING TONE SUPPLY CIRCUIT

John A. Hackett, Matawan, and William A. O'Connell, New Monmouth, N.J., assignors to Bell Telephone Laboratories, Incorporated, New York, N.Y., a corporation of New York Filed Aug. 12, 1964, Ser. No. 389,171
11 Claims. (Cl. 179—27)

Figure 1:
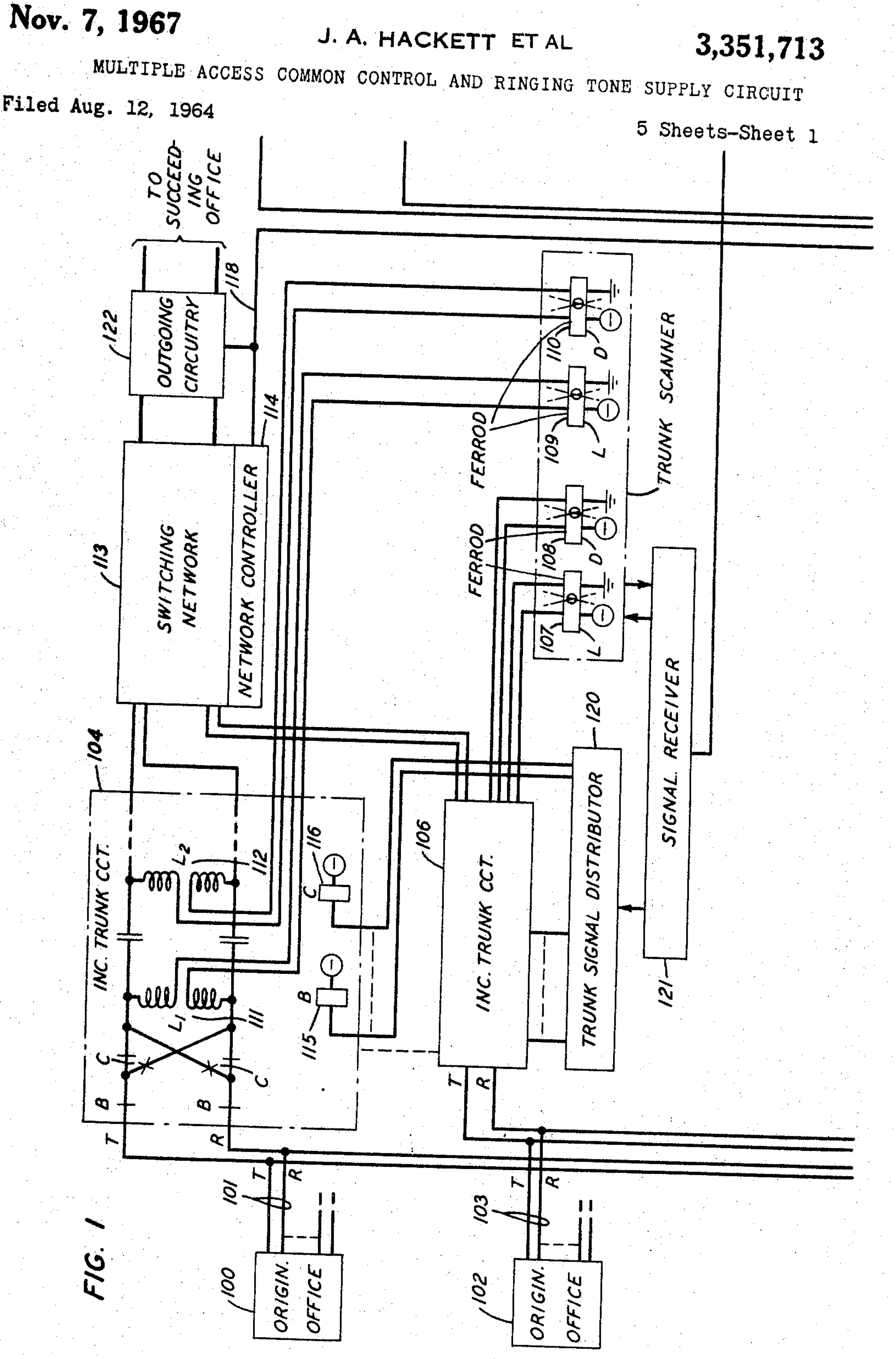

This invention relates to a circuit for returning an audible tone signal to a calling subscriber in a telephone switching system, and more particularly to a circuit for returning a tone signal to a subscriber during the time the progress of a call initiated by him is temporarily delayed in the course of its completion by the system. The invention further relates to a circuit for returning ringing tone to a calling subscriber on calls which require operator service for their completion, and still more particularly to a circuit for returning the ringing tone during the time the progress of such calls is temporarily delayed while waiting for the establishment of a connection to an operator position.

Recent advances in the telephone switching technology have increased the number of toll calls that may be completed on a subscriber direct-dialed basis. Many of these calls, such as those of the station-to-station type, are completed without operator assistance. Other types, such as person-to-person and collect, require a temporary connection to an operator position, either at a local or at an intermediate tandem or toll office, in order that the calling party may receive the call service he requires over and above the establishment of a comparable station-to-station connection.

The R. B. Curtis application, Ser. No. 318,275, filed Oct. 23, 1963, now Patent No. 3,341,661, issued Sept. 12, 1967 discloses a crossbar tandem office having operator positions which are bridged onto subscriber direct-dialed calls incoming to the office that require operator assistance for their completion. Each such tandem office is normally staffed with a sufficient quantity of operators so that an incoming call requiring assistance is connected to an operator with a minimum of delay. Offices of this type are engineered at the current time so that the average delay encountered in obtaining an operator does not exceed twc seconds. However, conditions may infrequently occur during which a call may wait for a period of time appreciably longer than two seconds before an operator position becomes available. It is desirable that an audible indication, such as ringing tone, be returned to the calling subscriber during such waiting periods in order that he may be apprised that his call is still being actively served by the system. If no tone signal were returned at this time, the calling party might abandon the call after mistakenly assuming that he has been connected to an inoperative circuit.

The system disclosed in the Curtis application utilizes either incoming trunks or senders, depending upon the call type, to return ringing tone whenever delays are encountered in obtaining a connection to an operator position. Most calls requiring operator assistance are connected to an operator in a sufficiently short time so that there is no need to return ringing tone to the calling circuit. As a result, the facilities required to equip the trunks and senders with the capability of returning ringing tone are used on only a small percentage of the calls handled by these circuits. The requirement that trunks and senders, both of which are furnished in large quantities, be equipped with these infrequently used facilities does not represent the optimum in economical design and increases the cost of the offices of which these circuits are a part. It would obviously be economically advantageous to remove the ringing tone equipment from circuits provided in large quantities and instead, to equip an office with a relatively few circuits especially designed for the purpose of returning ringing tone on calls requiring such service.

It is therefore an object of the invention to provide economical facilities whereby an audible signal, such as ringing tone, may be returned to a calling circuit during the time the progress of a call served thereby is delayed.

It is a further object of the invention to provide improved facilities for returning ringing tone to a calling circuit whenever the circuit is required to wait for the establishment of a connection to an operator position.

In accordance with the present invention, an economical means of returning ringing tone to a calling circuit is provided by utilizing a common control circuit having a data receiver, a ringing tone source, and a plurality of call-receiving inputs. The inputs are arranged so that once the common control circuit has performed its data-receiving function for a call served via a first one of its inputs, it disconnects the input from the data receiver and, if an operator is not immediately available, connects it to a ringing tone source to return ringing tone to the calling party until an operator position becomes available. Simultaneously with the connection of the first input to the ringing tone source, a second input is connected to the data receiver so that a subsequent call may be received and served via this input. In a similar manner, once the common control circuit has completed its data-receiving function for the call received via its second input, it disconnects the input from the receiver and connects it to the ringing source to return ringing tone to the calling circuit until an operator position becomes available. Other additional inputs may offer calls to the common control circuit in a manner similar to that just described for the first two inputs, with each input being transferable from the data receiver to the ringing tone source when the data-receiving services of the common control circuit are no longer required.

The common control circuit is disclosed herein as comprising a multifrequency (MF) signal receiver in an electronic switching system. The function of the receiver in such systems is to receive the calling and/or called station digits outpulsed in MF form from the preceding office and then to supply an output indication of the received frequencies to a master controller which translates and identifies the outpulsed digits. As is conventional in electronic switching systems, the controller may then take whatever further action is necessary to control the establishment of the connection signified by the received digits.

The MF receiver is a short-holding-time circuit since its only call function is to detect the outpulsed MF signals and to supply an output indication thereof to the master controller. Its operation is often completed in a time not appreciably longer than that required for the outpulsing operation, and it normally releases from the connection when outpulsing is completed in order that it may be free for the serving of other calls. It may be seen from the foregoing that it would not be feasible to increase the holding time of the MF receiver by requiring it to wait and return ringing tone to a calling circuit during the entire time the calling circuit may have to wait for a connection to an operator position. If this were done, the receiver holding time would be increased to such an extent that a considerable number of additional receivers would have to be provided in order to furnish adequate service during overload conditions.

The MF receiver disclosed herein has a plurality of call-receiving input circuits which are sequentially activated to extend calls to an MF detector within the receiver. Once the MF outpulsing is completed for a call, the input circuit serving the call is disconnected from the detector and, if an operator position is not immediately available, is simultaneously connected to a ringing tone source to return ringing tone to the calling subscriber until an operator position becomes available. Simultaneously with the connection of this input circuit to the ringing tone source, another input circuit is activated and connected to the detector, thereby preparing it for the serving of the next call in a similar manner. Other inputs serve subsequently received calls in the same manner as described for the first two inputs.

The provision of a common control circuit having a plurality of call-receiving inputs which are connectible to a ringing tone source in the foregoing described manner comprises an economical means of enabling a common control circuit to perform its normal functions on each call, as well as of enabling it to return ringing tone to those of its inputs serving calls which are required to wait for a connection to an idle operator position. This added function of the common control circuit is advantageously provided in a manner that does not increase its call holding time.

A feature of the invention is the provision in a switching system of a common control circuit having a ringing tone source and a plurality of calls serving inputs, each of which may be connected to the tone source when the other functions of the circuit are completed during the serving of a call.

A further feature of the invention is the provision of a common control circuit having a plurality of call-receiving inputs each of which may be initially connected to data-receiving circuitry and then subsequently be connected to an audible signaling source when the data-receiving functions of the circuit are completed.

A further feature of the invention is the provision in a switching system of a plural input MF receiver having a frequency detector and an audible tone source, together with facilities whereby an input currently serving a call may be disconnected from the detector and connected to the tone source, as well as facilities whereby another one of its inputs may be activated and connected to the frequency detection circuitry for the serving of a subsequently received call.

Figure 3:
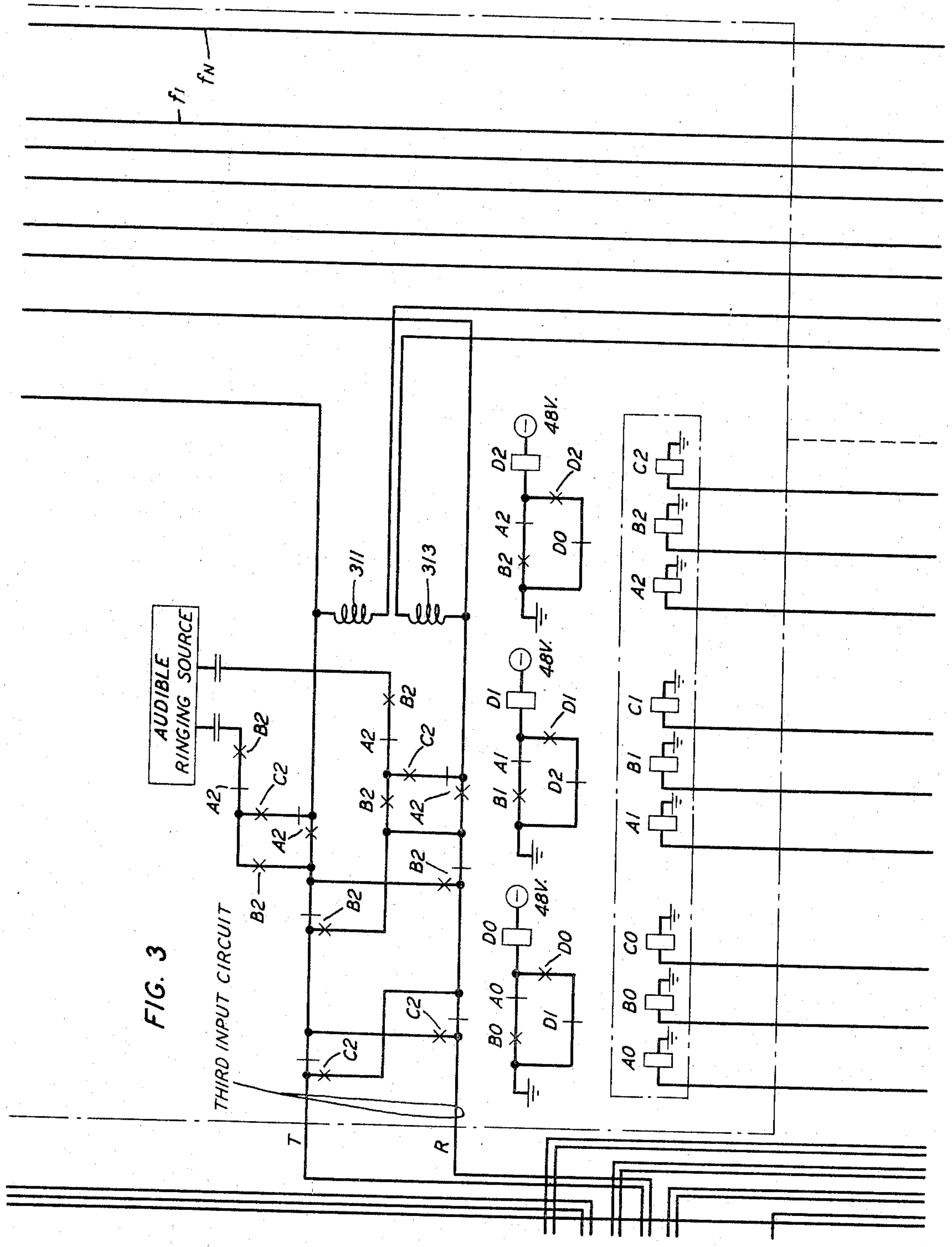
Figure 4:
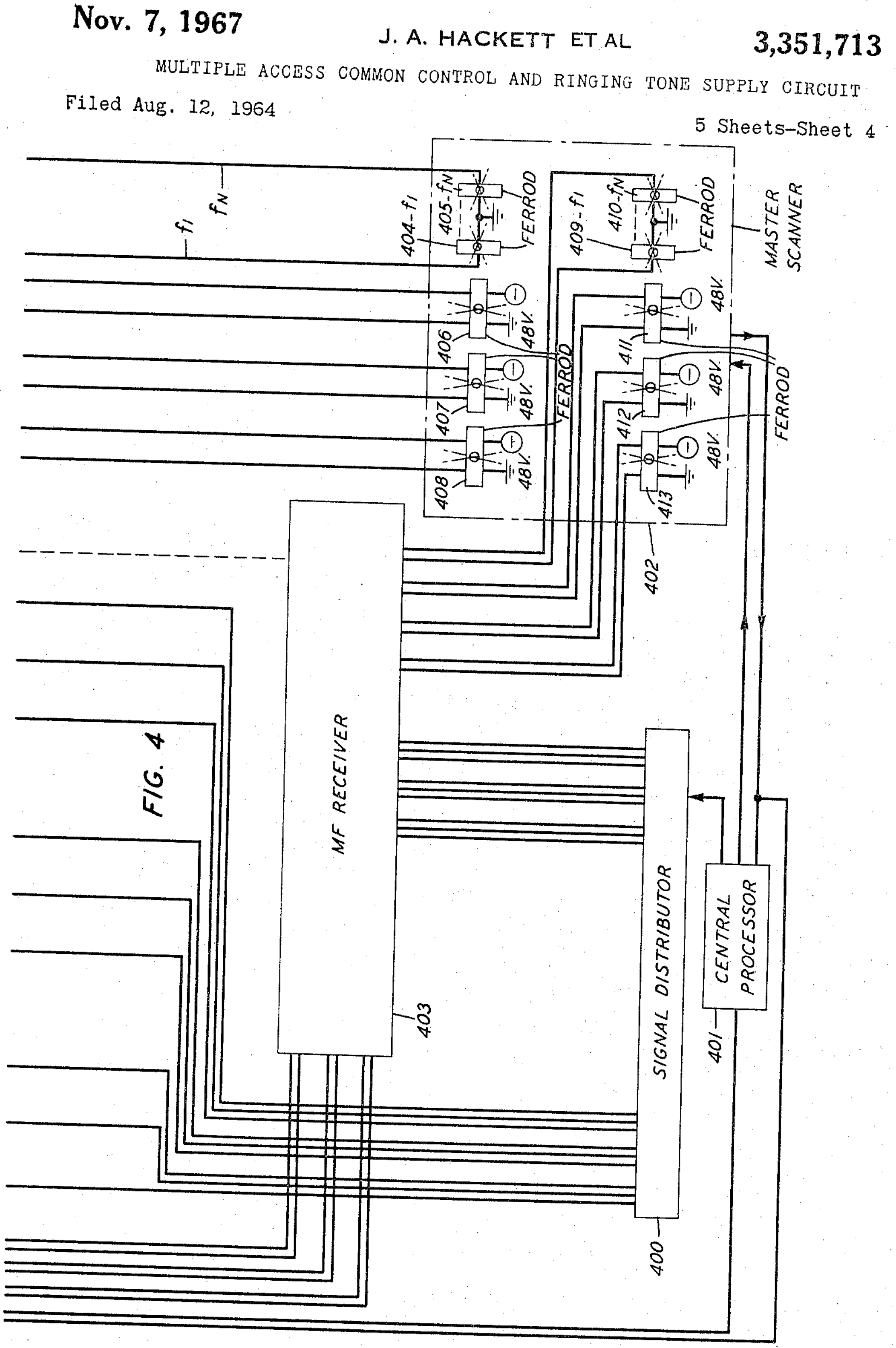
Figures 5, 6:
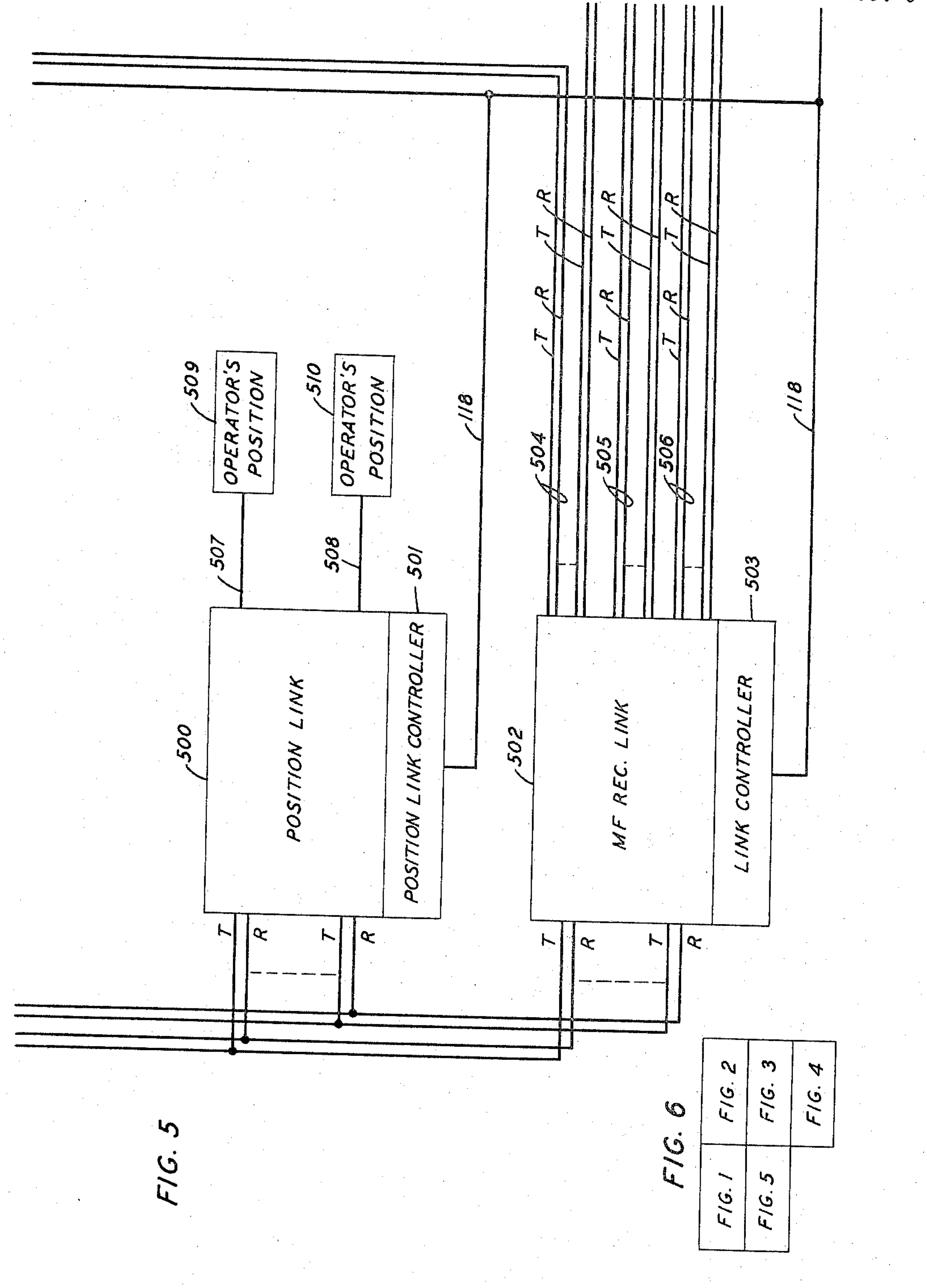

These and other objects and features of the invention will be more readily understood when read in connection with the following detailed description and drawing in which FIGS. 1–5, when arranged as shown in FIG. 6, disclose an exemplary embodiment of the invention.

The invention is disclosed as comprising a portion of an intermediate tandem switching facility which contains provisions for the serving of customer-dialed calls of the station-to-station type as well as those which require operator service for their completion. Calls are received at tandem over incoming trunks from local offices and, upon their arrival, the tandem facility prepares a path therethrough to an outgoing circuit extending towards a following office. Simultaneously therewith, the incoming connection is extended to an operator position if the call is of the type that requires operator assistance for its completion. The operator, when connected, furnishes the assistance required by the calling party, such as ensuring that the called party will accept the charges on a collect call, and then releases from the connection. If the call does not require operator assistance, the tandem facility merely provides a routine switching operation to extend the incoming connection to an outgoing circuit extending to the succeeding office.

FIG. 1 discloses a plurality of originating offices 100 and 102 which are connected to the tandem facility of the present invention by a plurality of trunks, including trunk 101 for office 100 and trunk 103 for office 102. Each trunk pair terminates on an incoming trunk circuit individual thereto, such as trunk circuit 104 for trunk pair 101 and trunk circuit 106 for trunk pair 103. Each trunk pair also has a termination on a position link 500 on FIG. 5 as well as on the MF receiver link 502. Link 500 is effective to interconnect a calling incoming trunk pair with any one of a plurality of operator positions 509 and 510 on calls requiring operator assistance, link 502 is effective to interconnect a calling incoming trunk pair with an MF receiver in order that the calling and/or called number information may be outpulsed from the originating office to the tandem facility. The switching network 113 and the network controller 114 together establish a connection through the outgoing circuitry 122 to the following office.

Figure 2:
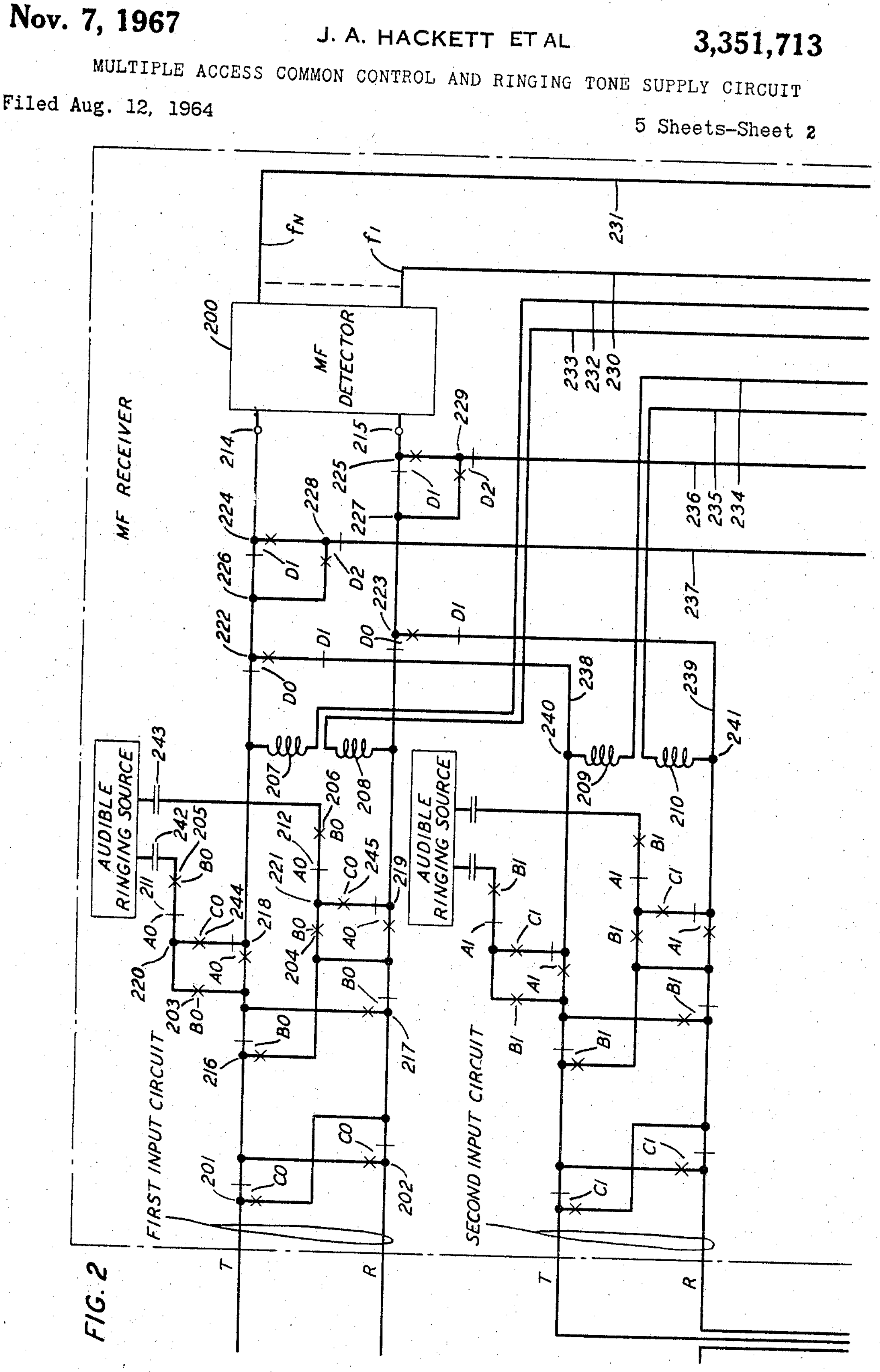

FIGS. 2, 3 and 4 together disclose a plurality of MF receivers with the details of one such circuit being shown on FIGS. 2 and 3 and with the remainder being shown diagrammatically on FIG. 4. Each receiver comprises an MF detector 200, an audible ringing tone source, a plurality of input circuits, and a relay controlled switching network by means of which each input circuit may be connected either to the MF detector or to the ringing tone source. The switching network for each input circuit comprises four relays individual thereto, as shown on FIG. 3, with the relays for the first input circuit being designated A0, B0, C0 and D0. The four relays individual to each of the other input circuits are similarly designated, except for a change in the numerical suffix portion of the designation.

The A-, B-, and C-relays associated with each input circuit are of the magnetic latching type in which an operate pulse is transmitted thereto to operate the relay, following which it remains operated until the reception of a release pulse. The pulses to operate and release these relays are received from the signal distributor 400 under control of the central processor 401 in the manner subsequently described. The D-relay in each input circuit is of the conventional type and its operation is controlled by a circuit including make contacts of its associated B-relay and the break contacts of its associated A-relay.

An input circuit can receive a call only when it is connected to the MF detector of its receiver. The inputs of each MF receiver are connectible to the detector therein under control of a preference circuit comprising the D-relays. The preference arrangement is such that the first input circuit is normally connected to the input terminals 214 and 215 of the detector. At this time, the other inputs of the same receiver are not connected to the detector and are unable to receive calls. The second input circuit is connected to the detector only when the first input circuit has been disconnected therefrom and connected to the audible ringing source. Similarly, the third input circuit is connectible to the detector only when both the first and second input circuits have been transferred from the input terminals of the detector to the audible ringing source.

The switching facility disclosed on the present drawing comprises an electronic switching system of the general type disclosed in the Doblmaier et al. application, Ser. No. 334,875, filed Dec. 31, 1963. As disclosed in detail in Doblmaier et al., the operation of such an office is under control of a central processor 401 which, in combination with a signal distributor 400 and a master scanner 402, keeps a constant check on the current status of all circuits within the office, recognizes service requests and changes of state of certain circuits in the office and, in response thereto, transmits commands to the various circuits in order that they may operate to perform the call service required by the calling trunk.

The signal distributor operates under control of the central processor to operate or release the magnetic latching relays A0, B0, and C0 on FIG. 3 for the first input circuit as well as the corresponding relays for the second and third input circuits under control of the central processor. The master scanner 402 operates, under control of the central processor 401, and, by means of ferrods, scans the input circuits of each MF receiver in order to determine their current call status. The scanner also scans the outputs of the frequency detector 200 in order to identify and register in the central processor the frequencies received on each MF outpulsing operation. This operation is performed by the scanner by means of circuitry including ferrods 404–f1 through 405–fN, each of which is individual to one of the frequencies that may be used in an outpulsing operation. A ferrod is a detector particularly useful in scanners and is disclosed in the Baldwin et al. application, Ser. No. 26,758, filed May 4, 1960, now Patent No. 3,175,042 issued Mar. 23, 1965. Such ferrod scanners are utilized in the above-mentioned Doblmaier et al. application, and one such scanner is disclosed in the Guercio et al. application, Ser. No. 250,-416, filed Jan. 9, 1963, now Patent No. 3,254,157, issued Mar. 23, 1965.

In order to describe the operation of the switching facility comprising the present invention, let it be assumed that a call requiring the services of an operator for its completion is originated at office 100 and extended therefrom over the tip and ring trunk pair 101 to trunk circuit 104 of the tandem facility. The incoming trunk circuits are of the electronically controlled type as disclosed in the Doblmaier et al. application and accordingly, each trunk circuit comprises magnetic latching relays whose operation and release are controlled by pulses received from the trunk signal distribtuor 120 under control of the signal receiver 121. Each trunk circuit also includes a plurality of ferrods physically situated within the trunk scanner, such as 109 and 110 for trunk circuit 104, so as to enable the central processor 401 to monitor the condition of the various portions of each trunk circuit.

The incoming trunk pair 101 is connected via the indicated circuitry within the trunk circuit to an associated L ferrod 109 within the trunk scanner. The extension of the call to this trunk by the originating office 100 at this time energizes ferrod 109 and thereby informs the central processor 401 that a call has been received. The central processor then initiates the circuit actions required including those subsequently described, for the extension of the call via the switching network 113, under control of network controller 114, to the succeeding office.

The central processor, once it is notified by the trunk scanner regarding the presence of a call on an incoming trunk, transmits a command to link controller 503 to cause link 502 to interconnect its appearance of calling trunk 101 with one of the MF receivers on FIGS. 2, 3, and 4. Let it be assumed that this call is served by the receiver whose details are shown on FIGS. 2 and 3. Let it be further assumed that this call is offered to this circuit via its first input which is connected to the link 502 via the conductor pair 504. Therefore, the central processor now causes link 502 to establish a path between the incoming calling trunk 101 and the tip and ring pair 504 extending to the first input circuit shown on FIG. 2.

When trunk circuit 104 is first seized by incoming trunk 101, it applies ground to the tip and negative battery to the ring conductor of the trunk. This combination of potentials is applied by the indicated circuitry within the trunk, including break contacts of relay B, break contacts of relay C, the windings of inductance 111, and the windings of ferrod 109 in the trunk scanner. The central processor 401, by means of the signal receiver 121 and the trunk signal distributor 120, causes the C relay in trunk circuit 104 to operate immediately prior to the time trunk 101 is connected by means of link 502 to the first input circuit of the MF receiver on FIGS. 2 and 3. The operation of the C relay operates its two sets of transfer contacts within trunk circuit 104 to reverse the potentials applied from the windings of ferrod 109 to the trunk. Thus, once relay C operates, the combination of applied potentials is such that negative battery is on the tip while ground is on the ring.

Once the link 502 has completed a path therethrough interconnecting trunk 101 with the conductor pair 504 extending to the first input circuit of the MF receiver, the central processor transmits a command, via the signal distributor 400, instructing it to apply an operate pulse to the magnetic latching relay A0. It simultaneously transmits an instruction via signal receiver 121 and trunk signal distributor 120 to cause relay B of the trunk circuit to operate. The make contacts 218 and 219 of relay A0 close as relay A0 operates in response to the reception of the operate pulse and, in so doing, complete a circuit, including the break contacts 201 and 202 of relay C0, and break contacts 216 and 217 of relay B0, to supply battery and ground to the tip and ring conductors 504, respectively. This circuit also includes the windings of ferrod 406 in the master scanner 402 and the windings of inductances 207 and 208 of the first input circuit. The combination of potentials now supplied by the first input circuit to trunk 101 is the same as that supplied thereto by trunk circuit 104 after its C relay operated as described. The operation of the B relay in trunk circuit 104 opens its break contacts, which effectively disconnect the trunk circuit from the incoming trunk pair. Thus, only the MF receiver is applying potentials to trunk pair 101 at this time.

The following potentials and changes of potentials have been applied to trunk pair 101, so far, during the serving of the currently described call: (1) ground is applied to the tip and battery to the ring by trunk circuit 104 at the time trunk 101 is seized by the originating office; (2) next, the C relay of trunk circuit 104 operates and reverses the potentials so that battery is applied to the tip and ground to the ring; (3) subsequently, the incoming trunk was connected to the first input circuit of the MF receiver and at that time, the same combination of potentials is applied to the trunk by the receiver as is currently being applied by trunk circuit 104, namely, battery on the tip and ground on the ring. Thus, so far, incoming trunk 101 has undergone one reversal of polarity.

Next, the central processor transmits a command to the signal distributor 400 instructing it to apply an operate pulse to the magnetic latching relay C0. This relay now operates and, by means of its transfer contacts 201 and 202, reverses the polarity applied to the tip and ring conductors 504 from ferrod 406. Thus, the trunk 101 is back to its original polarity condition with ground on the tip and battery on the ring. This particular sequence of trunk polarity reversals comprises what is known as a "wink" signal. This signal is transmitted back to the originating office, where it causes the office to outpulse the called number. Assuming the outpulsing to be of the MF type, the outpulsed digits are received over trunk 101 and applied via link 502, the tip and ring pair 504 to the first input circuit, and from there via make contacts 201 and 202 of relay C0, break contacts 216 and 217 of relay B0, make contacts 218 and 219 of relay A0, and break contacts of relays D0 and D1, to input terminals 214 and 215 of the MF detector 200. This detector may be of the conventional form well known in the art and includes an output conductor for each signal frequency that may be received. MF outpulsing is normally done in combinational code form, in which a plurality of frequencies are used for the transmission of each digit. Therefore, as the combination of frequencies representing each digit is received, a unique combination of output conductors f1–fN are energized to apply energizing signals to corresponding ferrods in the associated group of ferrods 404–f1 through 405–fN in the master scanner. The receipt of these signals by the ferrods is detected and transmitted by the scanner to the central processor, which determines the outpulsed digits from the combination of frequencies received.

The originating office outpulses both the called and calling numbers if it is equipped for ANI operation, or if it is not so equipped, it outpulses only the called number.

The central processor recognizes the termination of the called number outpulsing operation, and in response thereto, commands the signal distributor 400 to operate magnetic latching relay B0 by transmitting an operate pulse thereto. Relay B0 operates upon receipt of the pulse and, by means of its transfer contacts 216 and 217, once again reverses the polarity of the potentials supplied by ferrod 406 in the master scanner to the incoming trunk 101 via the link 502. This reversal of polarity is detected by the originating office, which, in response thereto, outpulses the calling station digits if the office is equipped for ANI. The ANI digits are received by the MF receiver, which applies an output indication thereto to the ferrods 404–$f1$ through 405–$fN$ to enter the digits of the calling number into the memory portion of the central processor in the same manner as for the called number.

Once the calling and called numbers for ANI operation, or the called number alone for non-ANI operation, have been entered into the processor, the processor recognizes that it has received sufficient information and proceeds with the serving of the call. In connection therewith, it instructs the position link controller 501, via conductor 118, to interconnect the position link appearance of incoming trunk 101 with an idle operator position, such as 509 for example. If an operator position is immediately available, the connection is established and the incoming trunk connection to the MF receiver, via link 502, is released. Once an operator is connected, she supplies the service required by the calling party before releasing from the connection. Simultaneously therewith, the central processor controls the establishment of a connection to the following office by means of controller 114, switching network 113, and outgoing circuitry 122.

As discussed earlier, an overload condition of the operator positions may occur from time to time, due to emergencies, disasters, etc., and during these times an operator position may not be immediately available for connection to a calling trunk. The central processor, by means of its memory facilities, determines whether an operator position is available on each call and, if one is, commands the establishment of an appropriate connection via link 500. If none is available, the central processor commands the signal distributor to transmit a release pulse to relay A0 to release it. The release of relay A0 recloses its break contacts 211 and 212 extending to the audible ringing source, so that audible ringing is now applied through capacitors 242 and 243, make contacts 205 and 206 of relay B0, and break contacts 211 and 212 of relay A0, to terminals 220 and 221. The ringing tone applied to these terminals is extended through make contacts 203 and 204 as well as 217 and 216 of relay B0, make contacts 201 and 202 of relay C, and back through link 502 to the calling trunk 101 as a signal to the calling party that the system is still actively in the process of serving the call.

The release of relay A0, in addition to completing the path by which ringing tone is returned to the calling circuit, also completes the following path to operate relay D0 on FIG. 3: ground, make contacts of relay B0 operated, break contacts of relay A0, to the winding of relay D0. The operation of relay D0 operates its transfer contacts 222 and 223, thereby disconnecting the first input circuit from the MF detector and connecting the second input circuit thereto.

The circuitry of the second input circuit is identical to that already described for the first input circuit, and calls may now be extended from other incoming trunks, via the link 502, conductor pair 505, and the second input circuit, to the MF receiver, all under control of the central processor 401, the signal distributor 400, and the master scanner 402.

In the same manner as described for the call served by the first input circuit, once the MF outpulsing has been completed for the call received via the second input circuit, relay A1 is released while relays B1 and C1 remain operated, thereby causing ringing tone to be applied to the second input circuit and returned via link 111 to the calling trunk, until an idle operator position is available.

The release of relay A1 while relay B1 remains operated completes a path on FIG. 3 to operate relay D1, which, in operating, in turn operates its transfer contacts 224 and 225. The operation of these transfer contacts disconnects the second input circuit from the MF receiver and connects the third input circuit thereto in series with the break contacts of relay D2.

The third input circuit may now serve a call in a similar manner as described for the other two input circuits and, once the MF outpulsing has been completed for its call, the third input circuit is disconnected from the MF detector and connected to the audible ringing source to return ringing tone to the calling circuit until an operator position becomes available.

Once an operator position becomes available for servicing a call to which ringing tone is currently being returned because of the prior unavailability of an operator position, link 502 releases the connection between the calling trunk and the input circuit of the MF receiver that served the call. The central processor at this time does not release any of the relays of the input circuit that served the call. This leaves the input circuit connected to the ringing source and maintains its associated D-relay operated. The central processor leaves an input circuit that has just served a call in this condition until all subsequent input circuits have served calls in order to provide an equitable distribution of the incoming calls among the various input circuits. Thus, as already described, the connection of ringing tone to the first input circuit operates its relay D0, which, with relays D1 and D2 released, transfers the input of the detector 200 from the first to the second input circuit. Subsequently once relay D1 operates as the second input circuit is connected to ringing tone, the input of the MF detector is transferred from the second to the third input circuit. In the meantime, the central processor maintains relay B0 operated and A0 released, which holds relay D0 operated even after the call served by the first input circuit has been connected to an operator's position and disconnected, via link 502, from the MF receiver. The maintaining of relay D0 operated maintains the first input circuit busy and prevents it from receiving further calls until the third input circuit has received a call.

Relay D2 is operated upon the operation of relay B2 and release of relay A2 as a call served by the third input circuit is connected to the ringing tone source. The operation of this relay disconnects the third input circuit from the detector and, by means of its make contacts 228 and 229 together with make contacts 224 and 225 of relay D1, effectively interconnects input terminals 214 and 215 of the detector 200 with the first input circuit at its contacts 222 and 223, in order that a subsequently received call may be served by the first input circuit even though the second and third input circuits remain connected to ringing tone source until operator positions become available. In this case, the central processor, once a call has been offered to the third input circuit, causes the relays associated with the first input circuit to release and restore that input circuit to normal in order to prepare it for the reception of a subsequent call. Once a subsequent call has been offered to the first input circuit, the central processor is programmed so that the second and third input circuits restore to normal as soon as the calls served thereby are connected to an operator position.

It is to be understood that the above-described arrangements are but illustrative of the application of the principles of the invention. Numerous other arrangements may be devised by those skilled in the art without departing from the spirit and scope of the invention. For example, the embodiment of the invention disclosed assumes that the signal receiver is of the MF type. This showing is merely exemplary and, if desired, other types of signaling, such as dial pulse, could be used and when so used, the present invention would function in the same manner as already described to provide an efficient and economical method of permitting a singled ata receiver having a plurality of inputs to be transferred from a first to subsequent ones of its inputs in the manner described as the prior inputs are connected to a signaling tone source.

What is claimed is:

1. In a telephone switching system, a common control circuit, a first call-receiving input normally prepared for extending a call to said circuit, a ringing tone supply, a second call-receiving input, means operative during the serving of a call received by said circuit via said first input for connecting said first input to said ringing tone supply, means simultaneously effective for preparing said second input for the extension of a call to said circuit, means operative during the serving of a call subsequently received by said circuit via said second input for connecting said second input to said ringing tone supply, another call-receiving input, and means operative for preparing said other input for the extension of a subsequent call to said circuit.

2. In a telephone switching system, a common control circuit having a data receiver and a ringing tone source, a first call-receiving input normally connected to said data receiver, a second call-receiving input, means operative during the serving of a call received via said first input for transferring said first input from said data receiver to said ringing tone source, means simultaneously effective for connecting said second input to said data receiver, means operative during the serving of a call received via said second input for transferring said second input from said data receiver to said ringing tone source, another call-receiving input, and means operative upon the transfer of said second input for connecting said other input to said data receiver for the serving of a subsequent call.

3. The invention recited in claim 2, in which said means for transferring is operative subsequent to the reception of call data on each call.

4. In a telephone switching system having a multifrequency receiver which is connected to an incoming calling circuit for the time required to receive call data outpulsed in multifrequency form from a preceding office and which is then made available for the serving of a subsequently offered call on another incoming circuit; a ringing tone source and a multifrequency detector in said receiver, a first call-receiving input normally connected to said detector, a second call-receiving input, means operative upon the termination of the outpulsing operation for a call received via said first input for transferring said first input from said detector to said ringing tone source, said means being simultaneously effective for connecting said second input to said detector, means operative upon the termination of the outpulsing operation for a call received via said second input for transferring said second input from said detector to said ringing tone source, another call-receiving input, and means operative for connecting said other input to said detector for the serving of a subsequent call.

5. In a telephone switching system, a common control circuit having call establishment control circuitry and a ringing tone source, a first call-receiving input normally connected to said establishment control circuitry, a second call-receiving input, means operative upon the completion of the function of said establishment control circuitry during the serving of a call received via said first input for transferring said first input from said establishment control circuitry to said ringing tone supply, means simultaneously effective for connecting said second input to said establishment control circuitry, means operative upon the completion of the function of said establishment control circuitry during the serving of a call received via said second input for transferring said second input from said establishment control circuitry to said ringing tone supply, another call-receiving input, and means operative upon the transfer of said second input for connecting said other input to said establishment control circuitry for the serving of a subsequent call.

6. In a switching system having incoming trunks, operator positions, and a multifrequency receiver comprising a multifrequency detector and a ringing tone source wherein an incoming call received via one of said trunks is initially connected to said detector and, upon the completion of the multifrequency outpulsing of call data from a preceding office, is transferred from said detector to an idle operator position, and if no position is currently available, is transferred to said ringing tone source until a position becomes available; said multifrequency receiver having a plurality of call-receiving inputs, only one of which is connectible to said detector at a time, means for connecting successive ones of said calling trunks to said detector, one at a time, over successive ones of said inputs, and means operable upon the end of the multifrequency outpulsing operation for each call, if an operator position is not then available, to transfer the calling trunk from said receiver to said tone source until an operator position becomes available.

7. In a switching system having incoming trunks, operator positions, and a common control circuit comprising a data receiver and a ringing tone source wherein an incoming call received via one of said trunks is initially connected to said receiver and upon the completion of the call function of said receiver is transferred therefrom to an idle operator position and, if no position is currently available, is transferred to said ringing tone source until a position becomes available; said common control circuit having a plurality of call-receiving inputs with a first one of said inputs being normally connected to said receiver and with only one of said inputs being connectible to said receiver at a time, means for connecting a calling trunk to said first input, means operative upon the completion of the data-receiving operation for the call received via said first input for transferring said first input from said data receiver to said ringing tone source upon the unavailability of an operator position, means simultaneously operable upon the transfer of said first input for connecting a second one of said inputs to said receiver, means for connecting a second calling trunk to said second input, means operative upon the completion of the data-receiving operation for the call received via said second input for transferring said second input from said data receiver to said ringing tone source upon the unavailability of an operator position, and means simultaneously operable upon the transfer of said second input for connecting another one of said inputs to said receiver for the serving of a subsequent call.

8. The invention cited in claim 7 in combination with means operable for transferring the call connected to said first input from said ringing tone source to an operator position upon the availability thereof, and means effective for transferring any other call from said ringing tone source to an operator position upon the availability thereof.

9. In a switching system having incoming trunks, operator positions, a multifrequency receiver comprising a multifrequency detector and a ringing tone source, together with facilities whereby an incoming calling trunk is initially connected to said detector for controlling the establishment of the call and is then transferred from said detector to an idle operator position, said system also having facilities whereby, if no operator position is currently available, said calling trunk is transferred from said detector to said ringing tone source until a position becomes available; said multifrequency receiver having a plurality of call-receiving inputs with a first one of said inputs being normally connected to said detector and with only one of said inputs being connectible to said detector at a time, means for connecting a calling trunk to said first input, means operative upon the completion of the multifrequency outpulsing operation for the call received via said first input for transferring said first input from said detector to said ringing tone source upon the unavailability of an operator position, means simultaneously operable upon the transfer of said first input for connecting a second one of said inputs to said detector, means for connecting a second calling trunk to said second input, means operative upon the completion of the multi-frequency outpulsing operation for the call received via said second input for transferring said second input from said data detector to said ringing tone source upon the unavailability of an operator position, and means simultaneously operable upon the transfer of said second input for connecting another one of said inputs to said detector for the serving of a subsequent call.

10. The invention cited in claim 9 in combination with means operable for transferring the calling trunk connected to said first input from said ringing tone source to an operator position upon the availability thereof, and means effective for transferring any other calling trunk from said ringing tone source to an operator position upon the availability thereof.

11. In a switching system having incoming trunks, operator positions, and a common control circuit comprising call establishment control circuitry and a ringing tone source; a plurality of call-receiving inputs connected to said common control circuit, means for connecting successive ones of said calling trunks to said establishment circuitry, one at a time, over successive ones of said inputs, and means operable upon the end of the call establishment control operation for each call, if an operator position is not then available, to transfer the calling trunk from said establishment circuitry to said tone source until an operator position becomes available.

No references cited.

KATHLEEN H. CLAFFY, *Primary Examiner.*

WILLIAM C. COOPER, *Examiner.*